(12) United States Patent
Kojima et al.

(10) Patent No.: US 7,872,771 B2
(45) Date of Patent: Jan. 18, 2011

(54) METHOD, APPARATUS, AND SYSTEM FOR CUSTOMIZING DRIVER

(75) Inventors: Nobuyuki Kojima, Yokohama (JP); Yasuhiro Hosoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1287 days.

(21) Appl. No.: 11/432,050

(22) Filed: May 11, 2006

(65) Prior Publication Data
US 2006/0268306 A1 Nov. 30, 2006

(30) Foreign Application Priority Data
May 24, 2005 (JP) .............................. 2005-151612

(51) Int. Cl.
G06F 3/12 (2006.01)
G06K 15/00 (2006.01)

(52) U.S. Cl. .................... 358/1.15; 358/1.14; 358/1.13

(58) Field of Classification Search .................. 358/1.1, 358/1.2, 1.13, 1.14, 1.15, 1.16, 1.17, 1.18, 358/1.9, 407, 468, 471; 715/700, 274; 347/2, 347/3, 5, 14, 23; 399/1, 8, 9; 719/321, 322, 719/323, 324, 325, 326, 327
See application file for complete search history.

(56) References Cited

U.S. PATENT DOCUMENTS

| | | | | |
|---|---|---|---|---|
| 6,924,826 | B1 * | 8/2005 | Nakagiri et al. | 715/700 |
| 7,400,427 | B2 * | 7/2008 | Honma | 358/1.15 |
| 7,464,335 | B2 * | 12/2008 | Nakagiri et al. | 715/700 |
| 2004/0141203 | A1 | 7/2004 | Honma | |
| 2006/0250631 | A1 * | 11/2006 | Igarashi | 358/1.13 |

FOREIGN PATENT DOCUMENTS

| | | |
|---|---|---|
| CN | 1517851 A | 8/2004 |
| JP | 2003-303304 A | 10/2003 |
| JP | 2003-333224 A | 11/2003 |
| JP | 2004-178249 A | 6/2004 |
| JP | 2004-213132 A | 7/2004 |
| JP | 2004-220532 A | 8/2004 |
| JP | 2005-031784 A | 2/2005 |
| JP | 2003-114788 A | 4/2006 |

* cited by examiner

Primary Examiner—Dov Popovici
(74) Attorney, Agent, or Firm—Canon U.S.A., Inc. I.P. Division

(57) ABSTRACT

An information processing apparatus, system and method which obtains restrictive print information determined for each user who operates a printer driver, and customizes a printer driver by setting a print setting value, as an initial value for the printer driver, which does not conflict with a condition indicated by the restrictive print information.

8 Claims, 11 Drawing Sheets

FIG.6

601 mail=muser@hogehoge.com
cn=Dummy INC., TOKYO OFFICE
o=Dummy, Inc.
ou=dummy networks
objictclass=duser
602 — pact : A3 color=no, A4 color=1000, A3 mono=1000, A4 mono=10000
603 — pact : nin1=force4in1
...

| RESTRICTION ITEM | PERMISSION | UPPER VALUE | ALTERNATIVE VALUE |
|---|---|---|---|
| COLOR, A3 | NO | 0 | MONO, A3 |
| COLOR, A4 | YES | 1000 | - |
| MONO, A3 | YES | 1000 | - |
| MONO, A4 | YES | 10000 | - |
|  |  |  |  |

| PRINTER ID | ID | USER NAME | TOTAL PAGE NUMBER | PAPER SIZE | PRINT COLOR | PRINTING METHOD | PRINT RESULT |
|---|---|---|---|---|---|---|---|
| MULTIFUNCTION PERIPHEAL 101 | 1 | SUZUKI | 123 | A4 | COLOR | TWO-SIDED | SUCCESS |
| | 2 | TANAKA | 56 | B4 | MONO | ONE-SIDED | FAILURE |
| | 3 | SATO | 78 | A4 | COLOR | TWO-SIDED | SUCCESS |
| | 4 | SATO | 90 | A3 | MONO | ONE-SIDED | SUCCESS |

| FUNCTION | SETTING VALUE |
|---|---|
| PAGE LAYOUT | 2 PAGES/SHEET |
| PRINTING METHOD | ONE-SIDED |
| PAPER SIZE | A4 |
| PRINT COLOR | COLOR |
| PRINT QUALITY | CLEAR |
| TONER SAVING | NO |

900, 901, 902

METHOD, APPARATUS, AND SYSTEM FOR CUSTOMIZING DRIVER

BACKGROUND OF THE INVENTION

1. Field of the Invention

The present invention relates to processing for setting a driver.

2. Description of the Related Art

To reduce the operational/and or maintenance costs required for a printer or a copying machine, an administrator of a printing system can set an upper limit with respect to a printable page number for each user (e.g., a division in a company or a person belonging to the division). This kind of management includes delivering a customized printer driver to a user's PC. In particular, the printer driver includes default values (i.e., initial set values) of print settings that can be customized for individual users. Distributing a customized printer driver can realize a print control system capable of restricting printing functions allowable for each user.

As an example of this kind of print control system, one server can manage all printer drivers to be installed on each PC in a printing system and can distribute an arbitrary printer driver with arbitrary initial settings to each PC via a network. According to the print control system, an administrator creates driver initialization files beforehand. A driver management server stores and manages the created driver initialization files together with corresponding printer drivers. A printer driver accompanied with its setting file can be distributed to a user's PC. Further, print restrictions (e.g., restrictions relating to the number of printable sheets) may be dynamically changed when print settings are not changed.

In a print system, a user may be charged (or assigned or limited to) restrictions with respect to printing functions. When the user executes a printing operation, the user is required to instruct a printing operation with print settings not violating the restricted printing functions. In particular, if a printing operation is interrupted by the print restrictions caused dynamically, a user has no way to know if the result of print (such as the number of printed sheets) has reached a restriction value and will not understand why the printing operation is suddenly interrupted.

If such dynamical restrictions are recognized as part of predetermined print settings, a user can manually change the print settings to resume the printing operation. However, many users seldom input detailed print settings before starting each printing operation. Instead, usually printing operations are executed without changing default print settings. In many cases, users have no sufficient knowledge about the restrictions charged to individual users.

Multifunctional print restricting systems can set various print restrictions to reduce the cost. However, the multifunctional print restricting systems are difficult to handle for many users, for example, in the operation for inputting or changing the settings as well as in understanding the print restrictions. A heavy burden is placed not only on users but also on system administrators who are in charge of education and instruction.

SUMMARY OF THE INVENTION

The present invention is directed to a customized driver capable of reflecting desired print restrictions.

At least one exemplary embodiment is directed to an information processing apparatus configured to produce a customized printer driver. The apparatus includes an acquiring unit configured to obtain restrictive print information determined for each user who operates a printer driver; and a setting unit configured to customize the printer driver by setting a print setting value, as an initial value for the printer driver, which does not conflict with a condition indicated by the restrictive print information.

At least one exemplary embodiment is directed to an information processing apparatus which includes a reception unit configured to receive print result information of a source of specific print data; a determination unit configured to determine whether the received print result information includes any item conflicting with a condition charged to the source of the print data; and a producing unit configured to, when the determination unit determines that the print result information includes an item conflicting with the condition charged to the source of the print data, produce restrictive print information not setting the item conflicting with the condition charged to the source of the print data.

At least one exemplary embodiment is directed to an information processing method for an information processing apparatus configured to produce a customized printer driver. The method includes obtaining restrictive print information determined for each user who operates a printer driver; and customizing the printer driver by setting a print setting value, as an initial value for the printer driver, which does not conflict with a condition indicated by the restrictive print information.

Further, at least one exemplary embodiment is directed to an information processing method including receiving print result information of a source of specific print data; determining whether the received print result information includes any item conflicting with a condition charged to the source of the print data; and producing, when it is determined that the print result information includes an item conflicting with the condition charged to the source of the print data, restrictive print information not setting the item conflicting with the condition charged to the source of the print data.

Additionally, another exemplary embodiment is directed to a control program for causing a computer to execute an information processing method for an information processing apparatus configured to produce a customized printer driver. The program includes an acquiring step of obtaining restrictive print information; and a setting step of customizing a printer driver by setting a print setting value, as an initial value for the printer driver, which does not conflict with a condition indicated by the restrictive print information.

Furthermore, another exemplary embodiment is directed to a control program configured to cause a computer to execute an information processing method. The program includes a reception step of receiving print result information of a source of specific print data; a determination step of determining whether the print result information received in the reception step includes any item conflicting with a condition charged to the source of the print data; and a producing step of, when it is determined in the determination step that the print result information includes an item conflicting with the condition charged to the source of the print data, producing restrictive print information not setting the item conflicting with the condition charged to the source of the print data.

Also, at least one exemplary embodiment is directed to a print setting management system including a printer driver server, a client computer, an access right producing server, and a result management server. The system further includes the printer driver server configured to customize a default value of print setting information based on restrictive print information charged to a user so that the default value can reflect a print restriction indicated by the restrictive print information, to produce a printer driver including the customized default value, and to transmit and install the produced printer driver on the client computer; the client computer configured to request the access right producing server to transmit a print restriction tag including a print restriction indicated by the restrictive print information, and to transmit the obtained print restriction tag to a printing apparatus as additional information attached to a print job produced according to the print setting information; the access right producing server configured to produce the print restriction tag in response to a request from the client computer and to transmit the produced print restriction tag to the client computer; the printing apparatus configured to determine whether the received print job violates the print restriction indicated by the print restriction tag attached to the print job; and the result management server configured to store print result information of a print job performed by the printing apparatus including information indicating the presence of any violation determined by the printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the present invention and, together with the description, serve to explain the principles of the invention.

FIG. 6 shows an example of restrictive print information according to an aspect of the present invention.

FIG. 7 is a table showing an example of an access control tag according to an aspect of the present invention.

FIG. 8 is a table showing an example of print result information according to an aspect of the present invention.

DETAILED DESCRIPTION OF THE EMBODIMENTS

Figure 1:
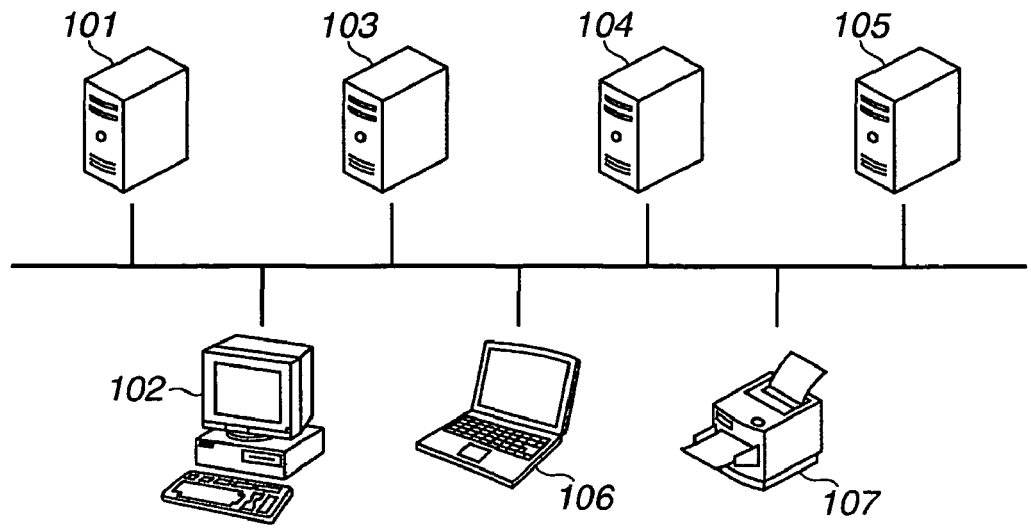
FIG. 1 is a schematic diagram illustrating an exemplary network printing system according to an aspect of the present invention.

Numerous exemplary embodiments will now herein be described below in detail with reference to the drawings. The following description of exemplary embodiments is intended to be illustrative in nature, and is in no way intended to limit the invention, its application, or uses. It is noted that similar reference numerals and letters refer to similar items in the following figures, and thus once an item is defined in one figure, it may not be discussed for following figures.

In many cases, printing works of general users are executed with default print settings. Accordingly, as far as the conditions are maintained so as not to violate print restrictions set in the default print settings, no print failure occurs due to violation of print restrictions. Hence, it is desirable to let a user install a printer driver having settings not violating the print restrictions. To this end, at the timing of newly changing the print restrictions of each user, it is desirable to install a printer driver having default settings not violating updated print restrictions.

In general, the print restrictions are changed in the following three cases. Therefore, it is desirable to install a printer driver having customized default values with respect to the print setting information (i.e., default customized printer driver) according to changeable print restrictions, in the following three cases:

(Case 1) when a system administrator sets directory information including print restrictions;

(Case 2) when a print result has reached print restrictions; and (Case 3) when any occurrence of error due to print restrictions is found.

First Exemplary Embodiment

The present exemplary embodiment enables customizing a printer driver at the timing of Case 1 or Case 2 and executes push installation of the customized printer driver for a client.

[Exemplary System Arrangement]

FIG. 1 shows an example of a network printing system. A directory server 101 can register settings relating to print restrictions (i.e., restrictive print information) for each user and each printing apparatus. In the present exemplary embodiment, the directory server 101 can register restrictive print information required when a user of a client computer 106 uses a printing apparatus 107. A terminal 102 can install a program that can function as a means for setting, in the directory server 101, restriction values of respective items included in the restrictive print information. The terminal 102 can also function as a terminal of another server. A printer driver server 103 can customize default settings of a printer driver and can push install the customized print driver to a user's PC.

In the present exemplary embodiment, a printer driver program can be distributed as software. The printer driver server 103 can be also called as a software distribution server capable of customizing a printer driver. An access right producing server (SA) 104 can return a reply relating to user's print restrictions in response to a request from the printer driver. A print result collection and management server 105 can collect and manage print results every time the printing apparatus 107 has executed a printing operation. The client computer 106 can be a user's PC. The printer driver server 103 can push install a printer driver to the client computer 106. The client computer 106 can control the printing apparatus 107 to output print products.

[Exemplary Arrangement of Printing Apparatus]

Figure 2:
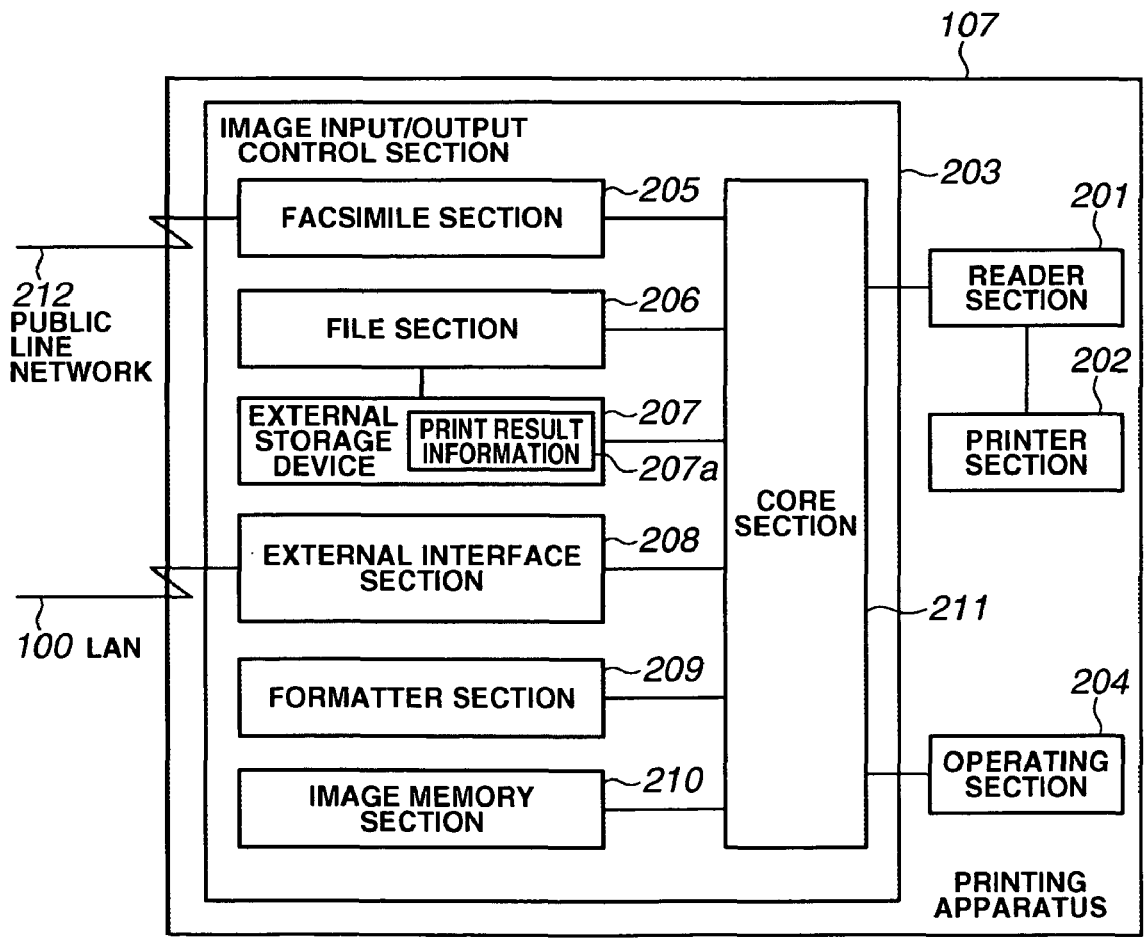
FIG. 2 is a block diagram illustrating an exemplary internal arrangement of a multifunction peripheral according to an aspect of the present invention.

FIG. 2 illustrates exemplary functional sections of the printing apparatus 107. The printing apparatus 107, in this example, is a multifunction peripheral having scanner, printer, copy, and fax functions. The printing apparatus 107 can be connected to other communication apparatus via a public line network 212. The printing apparatus 107 of the present exemplary embodiment is not limited to a multifunction peripheral and accordingly can be a digital copying machine, a printer with a copy function, a mono-functional printer, or the like.

The printing apparatus 107 includes a reader section 201, a printer section 202, an image input/output control section 203, and an operating section 204. The reader section 201 is connected to the printer section 202 and to the image input/output control section 203. The reader section 201 can read an image of an original in accordance with an instruction entered from the operating section 204 and can output readout image data to the printer section 202 or to the image input/output control section 203.

The printer section 202 can receive image data from the reader section 201 and the image input/output control section 203 and can print the received image data on a recording paper. The image input/output control section 203 is connected to a LAN or to the public line network 212 to input and output image data. Furthermore, the image input/output control section 203 can analyze and control a job (e.g., print commands) The image input/output control section 203 includes a facsimile section 205, a file section 206, an external storage device 207, an external interface section 208, a PDL (page description language) formatter section 209, an image memory section 210, and a core section 211.

The facsimile section 205, connected to the core section 211 and to the public line network 212, can expand compressed image data received from the public line network 212 and transmit the decompressed image data to the core section 211. Furthermore, the facsimile section 205 can compress image data received from the core section 211 and can transmit the compressed image data, via a public line, to the public line network 212. The file section 206, connected to the core section 211 and to the external storage device 207, can compress image data received from the core section 211 and send the compressed image data together with a search keyword to the external storage device 207. The external storage device 207, constructed from a hard disk or the like, can store the compressed image data with the search keyword.

The file section 206 can search compressed image data stored in the external storage device 207 based on a keyword transmitted from the core section 211. Then, the file section 206 can read and decompress the compressed image data retrieved from the external storage device 207 and can transmit the decompressed image data to the core section 211. The external storage device 207, for example, stores print result information 207a (from FIG. 2). Furthermore, the external storage device 207 can temporarily store job control information or print data relating to a print job received from the client computer.

The external interface section 208 is, for example, a network interface card that can control communications between the core section 211 and respective servers or the client PC 106. The core section 211 can execute transmission/reception of job control data and image data to and from the client PC 106 via the external interface section 208. The job control data include job control commands transmitted with PDL data. For example, one of such job control commands can be used to expand PDL data and printing image data, and then output stapled and sorted printed papers.

The formatter section 209, connected to the core section 211, can receive PDL data transmitted from a computer and expand the received PDL data into image data that the printer section 202 can print. The image memory section 210 can temporarily store the information received from the reader section 201 and the information transmitted via the external interface section 208 from a computer.

The core section 211 can control the data exchanged among the reader section 201, the operating section 204, the facsimile section 205, the file section 206, the external storage device 207, the external interface section 208, the PDL formatter section 209, and the image memory section 210. The core section 211 can analyze the job control data. The core section 211, equipped with a CPU and a memory, can execute a predetermined program for controlling the above-described sections.

The print result information is, for example, the information relating to the result of use by each user in each printing apparatus (i.e., the printing apparatus 107 or the client computer 106). FIG. 8 shows one example of the print result information 800. Each line (e.g., result information 810) represents print result information corresponding to one print job. FIG. 8 shows result information of four print jobs. Print result can be recorded for each print job with a unique identifier, a user name (i.e., owner name) of the print job, in addition to another items including total page number, paper size, print color, printing method, and print result (success/failure). Furthermore, the print result can include other items, such as use of a finisher and processing time. The print result collection and management server 105 can collect and store the print result information.

[Exemplary Configuration of Computer]

Figure 3:
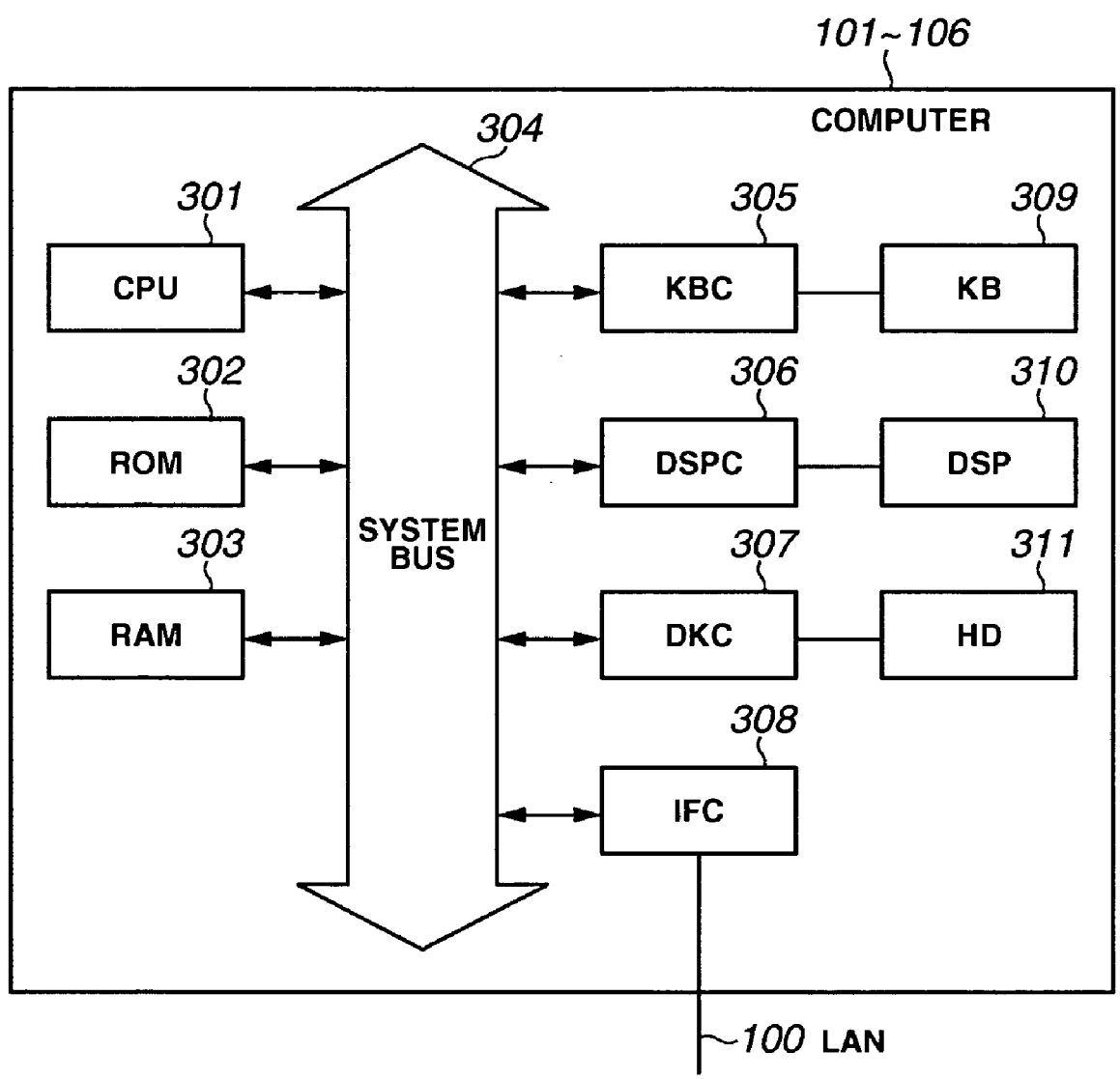
FIG. 3 is a block diagram illustrating an exemplary internal arrangement of a personal computer according to an aspect of the present invention.

FIG. 3 shows one example of the hardware configuration of each server computer and the client PC (101-106). A CPU 301 can execute a program (or programs) of a print control system stored in a ROM 302 or a hard disk (HD) 311 or supplied from a flexible disk drive (not shown). The CPU 301 can control various functional blocks connected to a system bus 304.

A RAM 303 can function as a main memory, a work area, or the like of the CPU 301. A keyboard controller (KBC) 305 can control instructions entered from a keyboard (KB) 309 or from a pointing device (not shown). A display controller (DSPC) 306 can control the display of a display unit (DSP) 310. A disk controller (DKC) 307 can control an access to a recording apparatus, such as a CD-ROM (not shown), a hard disk (HD) 311, or a flexible disk controller (not shown).

The hard disk (HD) 311 and the flexible disk controller can store a boot program, an operating system, a printer driver, various applications, edit files, user files or the like. An interface controller 308 can control transmission/reception of information to and from the printing apparatus 107 via a network, for example, the LAN 100.

[Exemplary Network Printing System]

Figure 4:
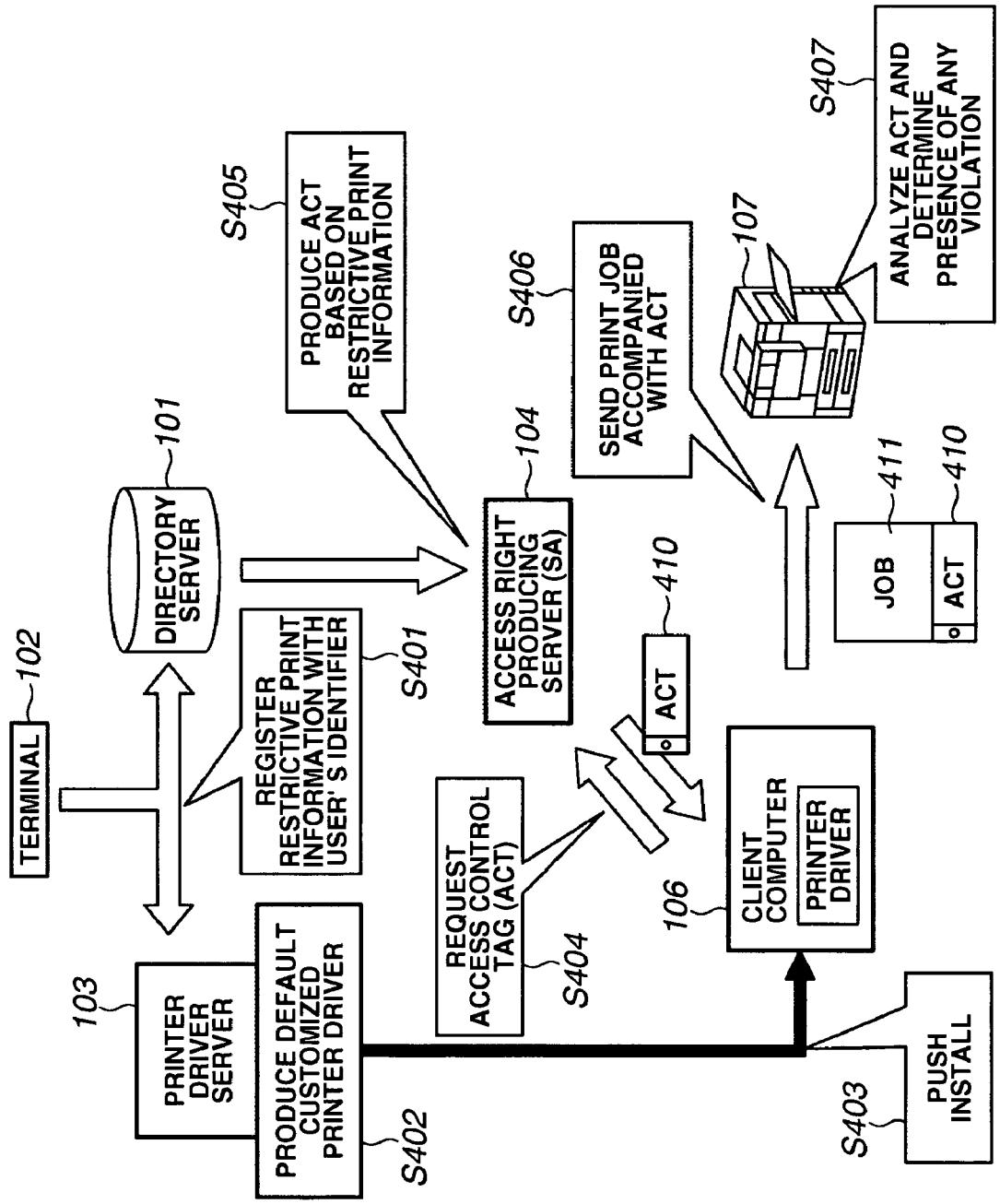
FIG. 4 is a diagram illustrating an exemplary printing procedure of a printing system according to an aspect of the present invention.

Exemplary operations of the network printing system will be described below with reference to FIGS. 4 and 5. Referring to FIG. 4, first, a system administrator inputs restrictive print information for each user through the terminal 102. The directory server 101 registers the entered restrictive print information together with a user's identifier (refer to step S401).

[Exemplary Restrictive Print Information]

FIG. 6 shows an example of the restrictive print information. The restrictive print information can be stored, for example, in a hard disk of the directory server 101. Respective server groups shown in FIGS. 4 and 5 are logical programs or the hardware of server apparatuses. Respective server groups (101, 103, 104, and 105) can be present in a single computer or in plural computers (refer to FIG. 3), so that a CPU of each computer can execute or control them.

The restrictive print information 601 shown in FIG. 6 describes print restrictions identified by "pact". According to the example shown in FIG. 6, a restriction field 602 describes the following restrictions. The description "A3 color=no" indicates that the color print of A3 size cannot be permitted. The description "A4 color=1000" indicates that the color print of A4 size can be permitted up to 1000 pages.

Similarly, the description "A3 mono=1000" indicates that the monochrome print of A3 size can be permitted up to 1000 pages. The description "A4 mono=10000" indicates that the monochrome print of A4 size can be permitted up to 10000 pages. The printing operation can be executed according to the upper limits described in the restriction field 602 (i.e., restrictive print information).

For example, a predetermined user interface screen can be displayed on the terminal 102, so that an operator can input restriction values on the user interface so that the restriction information shown in FIG. 6 can be created according to a predetermined program. The item restricting the print page number is called a restriction item.

According to the example shown in FIG. 6, the restriction item is numerical information not accompanied by an item name. However, the item name can be also designated. According to the example of FIG. 6, the restriction item in the restriction field 602 is the print color (color/monochrome) and the paper size. The left side of an equation described in the restriction field shows the restriction item, and the right side of this equation shows an upper limit of an item related to the restriction item. An identification name of the restriction item can be known from its value. Similarly, an identification name of a relevant item having an upper limit can be known from its value. According to the example of FIG. 6, the relevant item has a numerical value that shows the page number.

On the other hand, a restriction field 603 designates a restriction item relating to the layout (nin1). The right side of an equation (i.e., descriptor "force4in1") indicates that the printing operation is performed with the 4in1 layout. The left side (i.e., nin1) indicates that the restriction item has an identification name. According to the example of the restriction field 603, the value of the restriction item is restricted by the value shown in the right side of the equation.

As apparent from the foregoing description, the restrictive print information includes the information from which a restriction item and its value can be identified as well as the information from which a relevant item related to the restriction item value and its upper limit can be identified. Furthermore, the restrictive print information includes the information from which a restriction item name and its restriction value can be identified.

Furthermore, although not shown in FIG. 6, an alternative value can be designated for any value in the restriction item and the alternative value can be used when the page number exceeds the upper limit. For example, when the upper limit of the A3 color is designated to 0, the A3 monochrome can be designated as an alternative value of the restriction item.

In the present exemplary embodiment, the upper limit of the page number is set for each designated value in the restriction item. However, instead of using the page number, a restriction value relating to other item can be designated. For example, the restriction item can be color/monochrome and an upper limit of a size item can be designated (for example, the A4 size can be designated as an upper limit in the color print).

Now referring back to FIG. 4, the entered restrictive print information can be also transmitted to the printer driver server 103. In response to reception of new restrictive print information, the printer driver server 103 produces a printer driver program including customized default values of the print setting information (refer to step S402). The print setting information is, for example, the settings that a user can designate in the beginning of a printing operation.

The print setting information includes various items, such as paper size, print color (color/monochrome), designation of two-sided/one-sided, layout method (Nin1), and paper discharging. In the present exemplary embodiment, program codes of a printer driver are unchangeable and the default values of the print setting information can be customized.

Hence, it is possible to produce only the default values of the print setting information not including the program codes. However, in this case, only the default values of the print setting information must be push installed on the client computer 106. In the present exemplary embodiment, an installation module including the program codes and default values of the print setting information is produced.

Figures 9, 10:
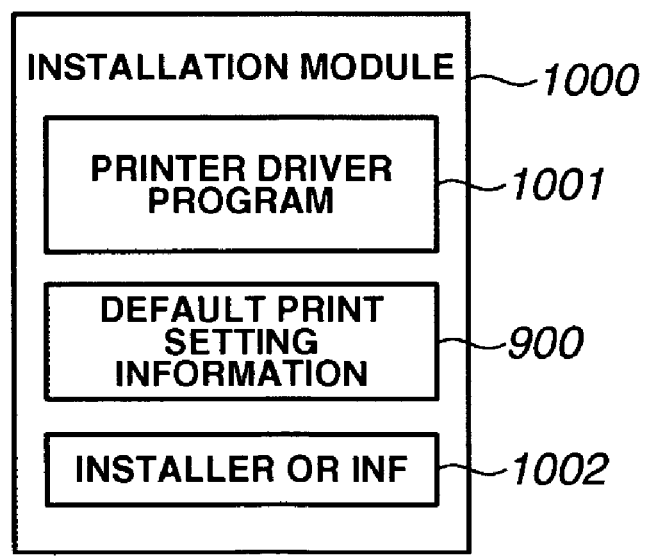
FIG. 9 is a table showing an example of print setting information according to an aspect of the present invention.
FIG. 10 is a diagram illustrating an example of an installation module of a printer driver according to an aspect of the present invention.

FIG. 10 shows an example of an installation module 1000 that includes printer driver program codes 1000, print setting information (default values) 900, and installer program codes 1002 if necessary. For example, an installation function can be provided by the WINDOWS (registered trademark). In this case, the installation module 1001 can includes an INF file that describes the information relating to the installation.

Referring back to FIG. 4, the printer driver server 103 transmits the produced installation module of the printer driver to the client computer 106 to let the installer automatically execute the installation. With this operation, the printer driver server 103 can accomplish push installation of the printer driver (refer to step S403). In this condition, the client computer 106 can perform a printing operation with the installed printer driver.

In this case, unless a user operates intentionally, print settings for a printing operation are default values of the print setting information installed as part of the printer driver.

It is now supposed that a user executes a print job using the printing apparatus 107. Prior to the execution of a print job, the printer driver installed on the client computer 106 requests the access right producing server 104 to transmit an access control tag 410 (ACT) relating to a user (i.e., an owner of the print job) (refer to step S404). The access right producing server 104 determines whether there is any access control tag relating to the requested user.

When no access control tag is present, the access right producing server 104 obtains the restrictive print information charged to the requested user from the directory server 101 and produces an access control tag (refer to step S405). Then, the access right producing server 104 transmits the acquired access control tag to the client computer 106. The user (i.e., the printer driver 106) obtains the access control tag transmitted from the access right producing server 104, and sends the access control tag 410 together with the print job 411 to the printing apparatus 107 (refer to step S406). The printing apparatus 107 receives both the access control tag and the print job.

The printing apparatus 107 compares the restrictive print information included in the access control tag with the print setting information described in the print job (also referred to as print instruction information), and determines whether the print job violates the print restrictions (refer to step S407). The printing apparatus 107 executes a printing operation only when no violation is found.

[Exemplary Access Control Tag]

The access control tag of the present exemplary embodiment can be, for example, stored in a hard disk of the access right producing server 104. FIG. 7 shows an example of the access control tag which includes a table 701 correlating a restriction item value 702 designated in the restrictive print information, a permission flag 703 indicating whether a print relating to the restriction item value is permitted, an upper limit 704 of a relevant item, and an alternative value 705 of the restriction item value used when the permission flag 703 is No (i.e., when the print relating to the restriction item value is not permitted).

Regarding the restriction item and the upper limit, relevant item names can be added so that item names can be easily identified. FIG. 7 shows the access control tag produced based on the restrictive print information 601 of FIG. 6. FIG. 7 shows two items of "print color" and "paper size" as the restriction items. The upper limit is a print page number being set as relevant item. The first line includes the following information. When the print settings designate that the print color is "color" and the paper size is A3 (as shown in the restriction item value), no printing is permitted (as indicated by a permission flag). The upper limit is set to 0.

A print request regarding the restriction item value (i.e., the print color is "color" and the paper size is A3) can be replaced with alternative print settings (i.e., the print color is "monochrome" and the paper size is A3). Regarding the restriction item value and the upper limit, the values being set in the restrictive print information 601 can be directly copied. When a newest relevant item exceeds the upper limit, the permission flag is set to "NO." Otherwise, the permission flag is set to "YES."

Furthermore, the alternative value 705 can be appropriately selected from restriction item values if their permission flag values are "YES" when it is not particularly designated. If there are plural restriction items, the prior order can be set among respective items. For example, according to the example of FIG. 7, the paper size is assigned a higher priority order compared with the print color. In this case, the value can be changed from an item having a lowest priority order, to find the settings including a permission flag of "YES." Accordingly, in the process of creating access restriction information, it is desirable to perform the settings relating to the alternative value after accomplishing other fields.

Figure 5:
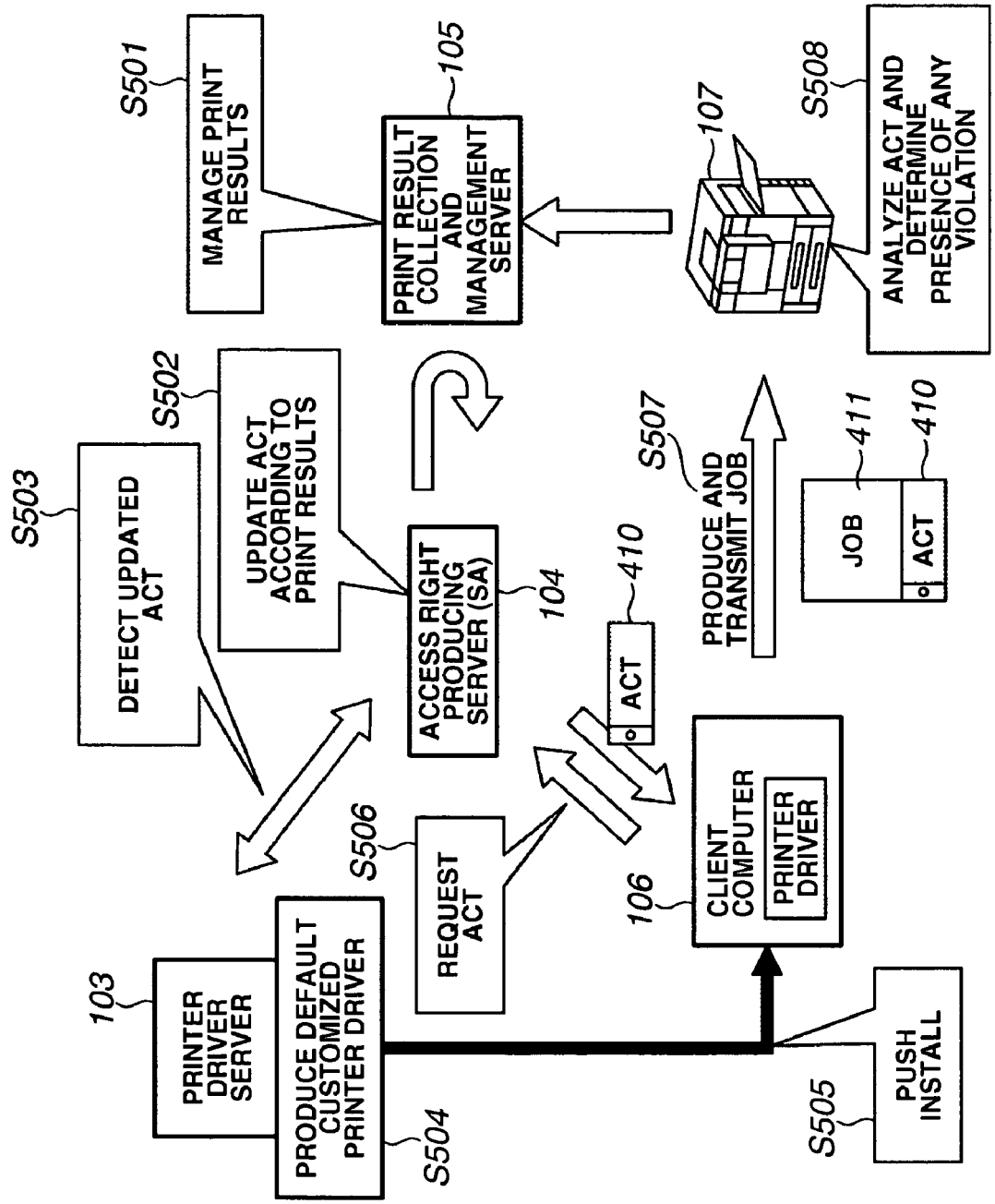
FIG. 5 is a diagram illustrating another exemplary printing procedure of a printing system according to an aspect of the present invention.

When the print job is transmitted to the printing apparatus 107, the printing system executes the control shown in FIG. 5. The printing apparatus 107, after accomplishing a printing operation (or even when no printing operation is executed), notifies the print result collection and management server 105 of print result information. The print result collection and management server 105 accumulates print results received from the printing apparatus 107 for each user (refer to step S501). The print results include the settings of each print job, a total number of printed pages, and information relating to success or failure.

The print result collection and management server 105, based on the received result information, executes accumulation processing about, for example, the total page number for each user, the cumulative page number for each paper size, the cumulative page number for each of color/monochrome prints, the cumulative page number for each of two-sided/one-sided prints, and the cumulative page number for each layout (i.e., page layout for disposing one or plural applications on one sheet)

When the received print job violates the print restrictions indicated by the access control tag, the printing apparatus 107 transmits the information notifying the presence of violation to the print result collection and management server 105 or to the client computer 106. Such information can be transmitted as part of the print result information. In this case, the print result information shows that the printed page number is 0.

[Exemplary Print Result Information]

FIG. 8 shows an example of the print result information transmitted from the printing apparatus 107 to the print result collection and management server 105. Here, FIG. 8 shows the print results of four users. However, when one print job belongs to one owner, the print result information can be transmitted independently for each owner from the printing apparatus 107 to the print result collection and management server 105.

According to the example of FIG. 8, the print result information 800 includes a printing apparatus identifier 808, a print job ID 801, a user name 802, a printed total page number 803, a paper size 804, a print color 805, a printing method 806, and a print result 807. It is desirable that the print result information includes all items that can be restricted. The print result collection and management server 105 counts a cumulative value for each item, for example for the page number. The item to be accumulated is not limited to the page number. In the restrictive print information, accumulation can be performed for any relevant item whose upper limit can be designated in relation to the restriction item.

For example, the accumulation result for a user Suzuki shows X pages for the paper size A4, Y pages for the page size A3, Z pages for the color print, and V pages for the monochrome print. The print result collection and management server 105 stores the accumulation results. The access right producing server 104 can be integrated with the printer driver server 103 and the print result collection and management server 105. One computer (FIG. 3) can function as three servers. For example, the printer driver server 103 can be CPU 301 of one computer that collects print result information. The printer driver server 103 (i.e., the printer driver server) uses the collected information.

The access right producing server 104 disclosed in the present exemplary embodiment can be the CPU 301 of the same computer shown in FIG. 3 that produces restrictive print information. Then, based on the produced restrictive print information, the printer driver server 103 (i.e., the CPU 301 of the same computer) can execute the customization processing for a driver. Then, the customized printer driver can be transmitted to a client computer, as described later. It is also possible that one computer (FIG. 3) functions as two servers and another computer functions as the remaining server.

Returning to FIG. 5, the access right producing server 104 polls the print result collection and management server 105 and updates the access control tag according to the print results (refer to step S502). The polling can be periodically performed at predetermined intervals considering the restrictions of the restrictive print information. For example, the polling performed every week will be preferable when the print restrictions are set for the print of one week for each user.

Regarding the update processing, for example, the access right producing server 104 can obtain, from the print result information, a value of a relevant item related to the restriction item value described in one access control tag. According to the example shown in FIG. 7, the access right producing server 104 can obtain, from the print result information, a newest value (i.e., the print page number accumulated since the previous accumulation timing) of a relevant item (i.e., page number) related to the restriction item values "print color color" and "paper size=A4" described in the access control tag.

The obtained newest value is compared with the upper limit of the relevant item. When the newest value is smaller than the upper limit, the permission flag is set to "YES." When the newest value exceeds the upper limit, the permission flag is set to "NO." In this case, an alternative value can be determined as described above and can be written into the access control tag. In response to the polling of the access right producing server 104, the print result collection and management server 105 returns the print result information obtained during a period from the previous polling to the newest polling.

Any method can be used if the access right producing server 104 can obtain the print result information during a period from the previous polling to the newest polling. In the access control tag, the fields other than the permission flag and the alternative value cannot be changed by the update processing in step S502. The access control tag has a flag indicating "updated but not polled by the printer driver server 103." This flag can be used in the management performed by the access right producing server 104.

Next, the printer driver server 103 polls the access right producing server 104, for example, at predetermined intervals, and checks whether the access control tag "updated but not polled by the printer driver server 103" is present. When such an access control tag is present (refer to step S503), the printer driver server 103 reads the access control tag and executes customization processing for the printer driver so as to equalize default values of the print setting information included in the printer driver with print restrictions described in the access control tag (refer to step S504).

Through the customization processing, any item belonging to the default print setting information has such a default value that a corresponding permission flag is not set to "NO" in the access control tag. Regarding the items not included in the access control tag, appropriate values are set for default values.

For example, regarding the value "print color=color" and "size=A4", which is the restriction item shown in FIG. 6, a corresponding permission flag is set to "NO." Therefore, these values are not used as default values of the print setting information created in step S504.

After that, processing similar to that of step S403, from FIG. 4 is performed. However, the access right producing server 104 needs not to create a new access control tag because the access control tag is already created. That is, the printer driver server 103 transmits the produced installation module of the printer driver to the client computer 106 to let the installer automatically execute the installation. With this operation, the printer driver server 103 can accomplish push installation of the printer driver (refer to step S505). Next, the printer driver installed on the client computer 106 requests the access right producing server 104 to transmit an access control tag 410 (ACT) relating to a user (i.e., an owner of the print job) (refer to step S506). The access right producing server 104 determines whether there is any access control tag relating to the requested user. Then, the access right producing server 104 transmits the acquired access control tag to the client computer 106. The user (i.e., the printer driver 106) obtains the access control tag transmitted from the access right producing server 104, and sends the access control tag 410 together with the print job 411 to the printing apparatus 107 (refer to step S507). The printing apparatus 107 receives both the access control tag 410 and the print job 411. Next, the printing apparatus 107 analyzes the ACT 410 and determines whether the print job violates the print restrictions (refer to step S508). Thereafter, the printing apparatus 107 notifies the print result collection and management server 105 of print result information. Then, the print result collection and management server 105 accumulates print results received from the printing apparatus 107 for each user (refer to step S501) and so on.

[Exemplary Print Setting Information]

Hereinafter, the print setting information included in a print job will be described. The client computer 106 can store, in its RAM or in the hard disk, the default values of the print setting information. The client computer 106 reads the print setting information and transmits the print setting information together with a print job to the printing apparatus when the printing apparatus performs a printing operation.

FIG. 9 shows an example of the print setting information. In the present exemplary embodiment, the print setting information 900 includes a function item name 901 and a setting value 902. The item name 901 can be replaced with the alignment order of setting values. The default values of the print setting information produced through the customization processing of the printer driver server 103 have the same arrangement as that of the print setting information shown in FIG. 9. However, a user can change the print settings for each printing operation. Respective items of the print setting information included in a print job may not be identical with the default values.

The printing system according to the present exemplary embodiment performs the above-described operations. Next, the processing of each server will be described with reference to flowcharts of FIGS. 11 through 14.

[Exemplary Input of Restrictive Print Information from Terminal 102]

Figure 11:
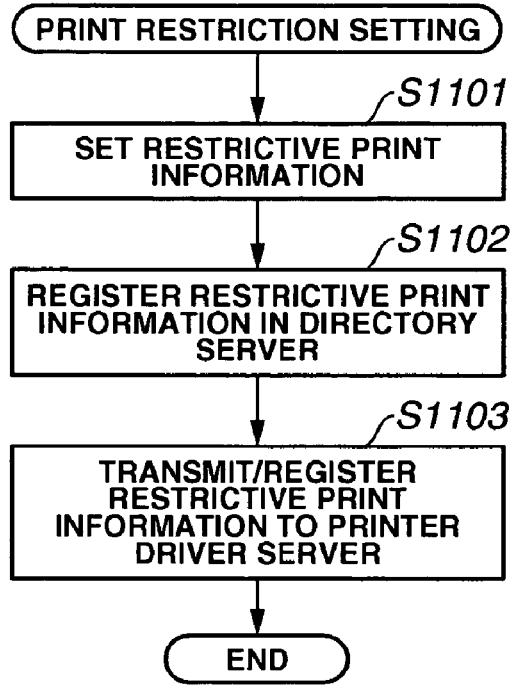
FIG. 11 is a flowchart showing an exemplary input sequence of restrictive print information by a system administrator according to an aspect of the present invention.

FIG. 11 is a flowchart showing exemplary processing of the terminal 102, the directory server 101, and the printer driver server 103 in the case 1 (i.e., "when a system administrator sets directory information including print restrictions"). In this case, static conditions are given as print restrictions. The processing can be applied, for example, to print restrictions such as "color print disabled" and "A3 paper unusable."

More specifically, the system administrator newly sets print restrictions for a user and a printing apparatus. In step S1101, a user uses a print setting utility or the like to perform settings (input) for the print restrictions. Next, in step S1102, the entered restrictive print information is registered in the directory server 102. Furthermore, in step S1103, the entered restrictive print information is transmitted to the printer driver server 103.

[Exemplary Driver Customization Processing (1) performed by Printer Driver Server]

Figure 12:
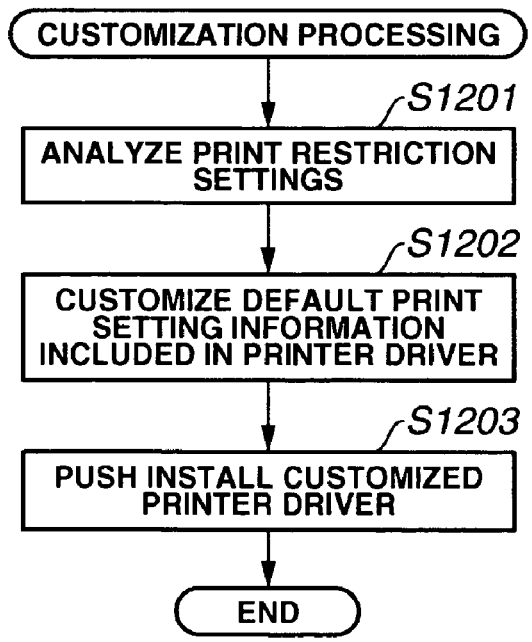
FIG. 12 is a flowchart showing exemplary processing of a printer driver server that can create a default printer driver based on print setting information set in a directory and push install the printer driver on a user's PC, according to an aspect of the present invention.

FIG. 12 is a flowchart showing exemplary processing of the printer driver server 103, performed in response to reception of the restrictive print information transmitted in step S1103 of FIG. 11.

In step S1201, the printer driver server 103 analysis the received restrictive print information. In the analysis, for example, the printer driver server 103 determines the relationship between the right side (i.e., restriction item) and the left side (relevant item) of an equation and related items. This judgment can be performed, for example, by using a table that indicates values of respective items.

In step S1202, the printer driver server 103 customizes the printer driver so that printer driver settings complying with the print restriction settings can be equalized with the default values of the print setting information. The default values should be within a range defined by the restrictive print information. Regarding the items not defined in the restrictive print information, another default values can be used if such alternative default values can be defined.

Even when the alternatively defined default values agree with the restriction item values defined in the restrictive print information, the printer driver can be customized with such default values. However, when the relevant item is the page number and its upper limit is limited to 0, no printing operation can be performed. In such a case, the default values can be changed adequately.

When the default values are changed, it is then checked whether there are any restrictions that disable the print according to the changed default values. The above described processing for determining the default values is repeated until the default values are determined for all items.

In step S1203, the printer driver server 103 push-installs the customized printer driver to a user's PC 106. The client computer 106 executes a printing operation with the installed driver and the default values of the print setting information.

[Exemplary Production of Access Control Tag by Access Right Producing Server]

Figure 13:
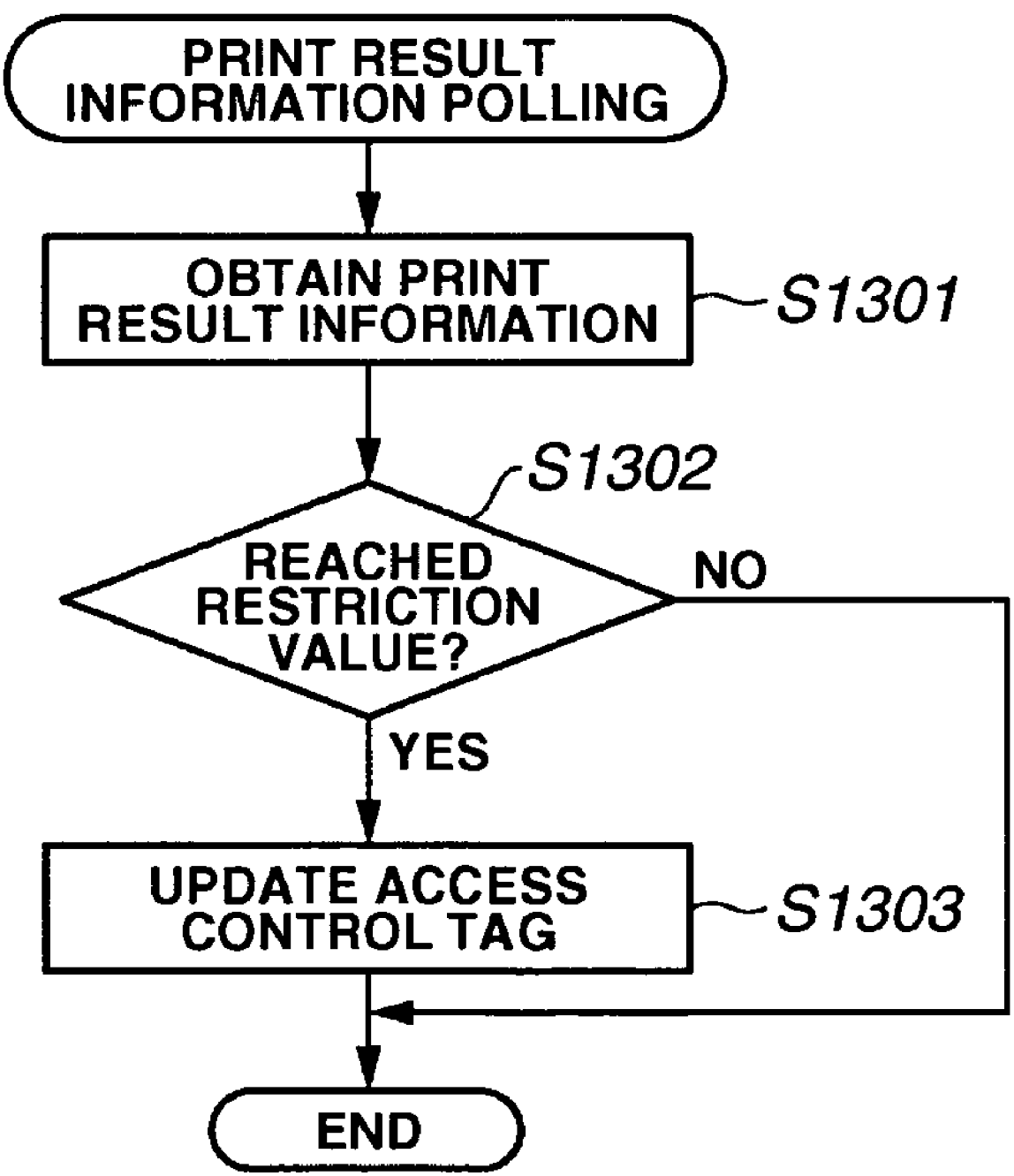
FIG. 13 is a flowchart showing exemplary processing of an access right producing server that obtains print results from a print result collection and management server and updating an access control tag, according to an aspect of the present invention.

FIG. 13 is a flowchart showing exemplary processing of the access right producing server 104 in a case 2 (i.e., "when a print result has reached print restrictions"). The processing can be executed when the upper limit, such as "up to 100 sheets for color print" or "up to 1000 sheets for A3 paper," is set as print restrictions and varying print results may dynamically conflict with the print restrictions. The print result collection and management server 105 accumulates the print results of the printing apparatus 107 every time the printing apparatus 107 executes a printing operation.

In step S1301, the access right producing server 104 periodically polls the print result collection and management server 105 and checks the print result of a concerned user. The time interval for the polling is identical with the time interval of the print restrictions charged to a user. For example, when the restrictions with respect to a print amount per week are charged to a concerned user, the polling for this user is performed every week. The time interval for the polling can be changed for each user.

In step S1302, the access right producing server 104 determines whether the print result (i.e., a printed page number) has reached a restriction value set for a concerned user (in general, an upper limit of a relevant item defined in the restrictive print information). If the printed page number has reached a restriction value set for a certain paper size, the access right producing server 104 updates the access control tag (refer to step S1303). The updated access control tag is sent to the client computer 106 in response to a request of the access control tag if newly issued by the client computer 106.

For example, the print page number for the A3 monochrome print is limited to 1000. If the accumulated print result (i.e., newest print result) exceeds the restrictions, the print of a relevant paper size and print color (i.e., A3 monochrome) relating to the restrictions cannot be permitted (i.e., the permission flag is set to NO). The restrictive print information tag is updated so as to reflect the above result. Accordingly, the processing of step S1302 is executed for all restriction items defined in the access control tag.

[Exemplary Driver Customization Processing (2) performed by Printer Driver Server]

Figure 14:
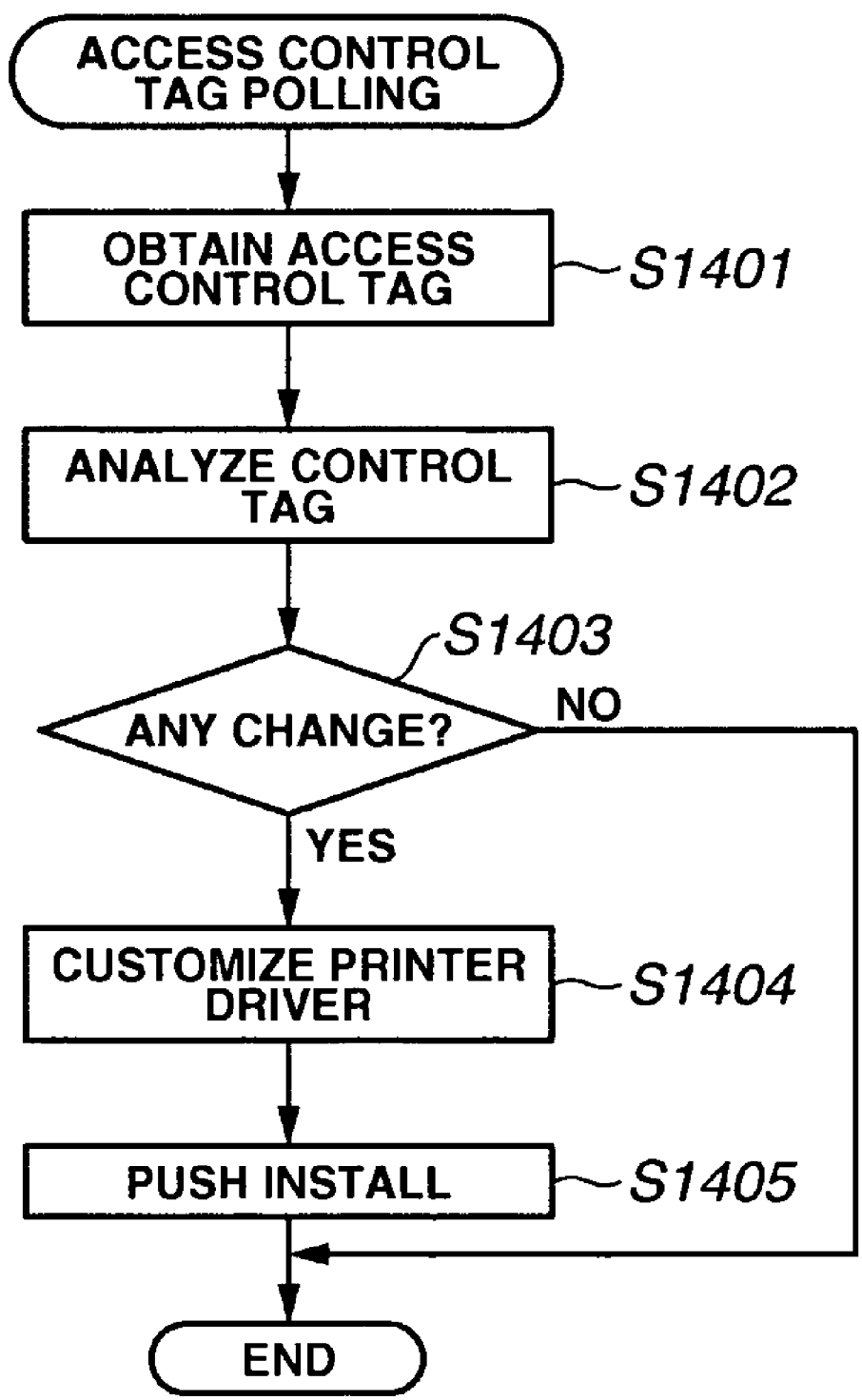
FIG. 14 is a flowchart showing exemplary processing of the printer driver server that can push install a printer driver when the printer driver is default customized in accordance with update of an access control tag, according to an aspect of the present invention.

The printer driver server 103 periodically polls the access control tag of each user. FIG. 14 shows exemplary processing of the printer driver server 103 with regard to the aforementioned polling operation. In step S1401, the printer driver server 103 polls the access right producing server 104 for each user to request and obtain the access control tag.

In step S1402, the printer driver server 103 analyzes the received access control tag. The analysis of step S1402 is similar to the analysis of the restrictive print information. In step S1403, the printer driver server 103 determines whether there is any change in the obtained access control tag compared with a previous tag. If there is any change, the printer driver server 103 customizes the printer driver in compliance with updated print restriction settings (refer to step S1404).

In the customization, default values are changed based on the access control tag. The printer driver server 103 produces an installation module of the printer driver, with respect to each restriction item whose permission flag is set to "No" (i.e., non-permission) in the access control tag, so that default values are differentiated from the restricted values.

Furthermore, in step S1405, the printer driver server 103 push installs the printer driver to the user's PC. No flag is required according to this method, although in the description of FIG. 14 the access control tag includes the flag indicating an updated condition. However, the printer driver server 103 must hold the access control tag.

As described above, the printing system according to the present exemplary embodiment can maintain an access control tag having newest information reflecting print results. Furthermore, the printing system according to the present exemplary embodiment can customize default values of the print setting information based on the access control tag, and can install a printer driver having customized default values on a client. Therefore, the client can prevent such an inconvenience that no printing operation can be performed due to confliction with designated restrictive print information when default print setting information is used.

Accordingly, the burden placed on a user or a system administrator can be reduced in the work for adjusting the settings in compliance with print restrictions. The productivity in a printing work can be improved. Furthermore, without any difficulty, a user can perform a printing operation so as to satisfy or fulfill designated print restrictions.

Second Exemplary Embodiment

The following exemplary embodiment relates to the Case 3 described in the beginning of the above-described exemplary embodiment, and allows the printing system to change default values of the print setting information.

Figure 15:
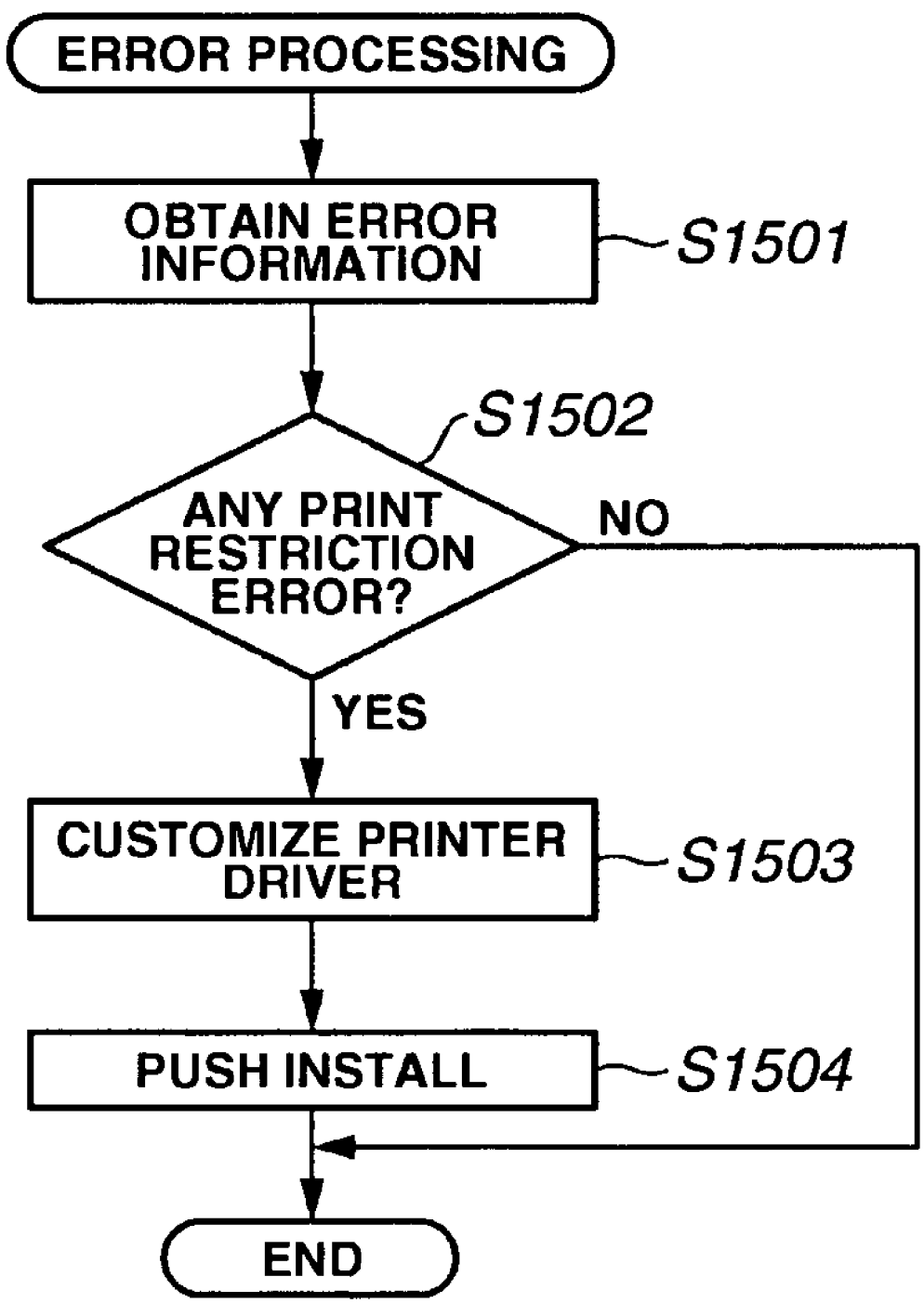
FIG. 15 is a flowchart showing exemplary processing of the printer driver server that can detect print errors occurring due to print restrictions and can push install a default customized printer driver, according to an aspect of the present invention.

FIG. 15 is a flowchart showing the processing of the printer driver server 103, performed in the case 3 (i.e., "when any occurrence of error due to print restrictions is found").

In the first exemplary embodiment, the access right producing server 104 must periodically poll the print result information obtained from the print result collection and management server 105 to determine whether the print result has reached an upper limit. Accordingly, a relatively heavy burden will be placed on the access right producing server 104 and the network.

On the other hand, the present exemplary embodiment detects any print failure occurring if the print result reaches a print upper limit. At this moment, the present exemplary embodiment push-installs a default customized printer driver so as to prevent all print failures occurring in a succeeding printing work. Accordingly, in a printing operation immediately after the print result reaches an upper limit, a print failure may occur due to violation of print restrictions. However, in the succeeding printing work, no print failure occurs.

Changing the default values of the print setting information may be meaningless, for example, if the print setting information is changed in a printing operation. Hence, when a print failure occurs due to violation of print restrictions, the default values of the print setting information need not be changed if the print setting information of this print job is not default values. This judgment can be performed in step S1502 of FIG. 15.

The print result collection and management server 105 detects error information received from the printing apparatus 107. The error information obtained from the printing apparatus 107 indicates that the printing apparatus 107 is in a print disabled condition due to confliction with print restrictions.

Referring to FIG. 15, first in step S1501, the printer driver server 103 detects the status of print failure. Then in step S1502, the printer driver server 103 determines whether the print failure is caused by the reason that the print result conflicts with a restriction value of an item relating to the restriction item.

Alternatively, the print result collection and management server 105 can detect the status of print failure in the process of collecting print results and can transmit the detected information to the printer driver server 103. In this case, the print result collection and management server 105 can receive the status of print failure in the step S1502 and can determine whether the print failure is caused due to upper limit violation. If such a failure is detected, the print result collection and management server 105 can notify the printer driver server 103 of occurrence of a print failure in step S1503.

Similar to the processing of steps S1202 and S1203 shown in FIG. 12, the printer driver server 103 produces a printer driver having default settings not violating newest print restriction settings charged to the user, and push-installs the produced printer driver on a user's PC.

As apparent from the above-described processing, the printing system according to the present exemplary embodiment does not change the default print setting information unless it detects any error disabling a printing operation due to confliction with the print restrictions.

With this arrangement, the printing system according to the present exemplary embodiment can prevent print failure occurring due to print restrictions when a printing operation is performed with the default print settings. Furthermore, the present exemplary embodiment requires no polling performed by the printer driver server 103 and the access right producing server 104. Thus, a burden placed on the printer driver server 103 or on the access right producing server 104 can be reduced. Furthermore, the network traffic can be reduced.

Other Exemplary Embodiments, Features and Aspects of the Present Invention

The present invention can be applied to a system including plural devices (e.g., a combination of a host computer, an interface device, a reader, and a printer) and can be also applied to an apparatus constructed from a single device (e.g., a copying machine, a facsimile apparatus, or the like).

Furthermore, the present invention can be accomplished by supplying a storage medium (or a recording medium) storing program code of software capable of realizing the functions of the above-described exemplary embodiments to a system or an apparatus. A computer (or CPU or MPU) of the system or the apparatus can read and execute the program code from the storage medium. In this case, the program code read out of the storage medium can realize the functions of the above-described exemplary embodiments. The program code and the storage medium storing the program code can constitute the present invention.

Furthermore, realizing the functions of the above-described exemplary embodiments is not limited to executing the program code read by the computer. The operating system (OS) running on the computer can execute part or all of the actual processing based on an instruction of the program code, to realize the functions of the above-described exemplary embodiments.

Furthermore, the program code read out of a storage medium can be written into a memory of a function expansion board equipped in a computer or into a memory of a function expansion unit connected to the computer. In this case, based on an instruction of the program code, a CPU provided on the function expansion board or the function expansion unit can execute part or all of the processing so that the functions of the above-described exemplary embodiments can be realized.

According to the present exemplary embodiments, a user can execute a printing operation with a printer driver having default print settings that do not violate the print restrictions charged to the user. Accordingly, even if the default settings are maintained, no print failure occurs due to violation of print restrictions. A user and a system administrator need not adjust the print settings. Usability can be greatly improved.

In the computer executing the printer driver server 103 that can produce a customized printer driver, the printer driver server 103 obtains restrictive print information determined for each user or a client computer (i.e., an example of an owner operating the driver). The printer driver server 103 customizes the printer driver by setting values relating to print settings, as initial values for the printer driver, which do not conflict with conditions indicated by the restrictive print information.

The restrictive print information can be given for each user and each printing apparatus. A result collecting server installed in the same computer can receive print result information from a specific client apparatus or user. The printer driver server 103 or the access right producing server in the same computer can determine whether the received print result information includes any item conflicting with conditions indicated by the restrictive print information.

When the received print result information includes an item conflicting with the conditions indicated by the restrictive print information, the printer driver server 103 customizes a printer driver to be installed in the client apparatus so that every item has a value relating to print settings not conflicting with the conditions indicated by the restrictive print information. The customized printer driver, set by the printer driver server 103, is transmitted to the client apparatus so that the client apparatus can install the customized printer driver.

The driver management server can obtain the restrictive print information from an access right producing server provided in another server apparatus that can communicate with the driver management server. The access right producing server receives print result information of a source of specific print data from a print result collecting server. Furthermore, the access right producing server determines whether the received print result information includes any item conflicting with conditions charged to the source of the print data.

When the print result information includes an item conflicting with the conditions indicated by the restrictive print information, the access right producing server produces restrictive print information not setting an item conflicting with the conditions indicated by the restrictive print information.

The access right producing server can transmit the produced restrictive print information to a printer driver server that can communicate with the information processing apparatus. The above-described restrictive print information includes at least one of restrictions relating paper size, color print, and monochrome print.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-151612 filed May 24, 2005, which is hereby incorporated by reference herein in its entirety.

What is claimed is:

1. A management system including a software distribution server for delivering a printer driver to a terminal by which a user issues a printing instruction, the management system comprising:
    an obtaining unit configured to obtain error information based on failure of a printing process performed by a print job according to a printing instruction of the user which is generated by a printing apparatus;
    a setting unit configured, when the error information obtained by the obtaining unit indicates failure of the printing process on the basis of a print restriction designated by print restriction information assigned to the user, to set a print setting as a default setting of the printer driver so as to reflect the print restriction designated by the print restriction information; and
        a distributing unit configured to distribute the printer driver to the terminal when a new default setting is performed by the setting unit, wherein the
    failure of the printing process based on the print restriction designated by the print restriction information is failure caused by changing the print restriction designated by the print restriction information in accordance with a print result obtained in a printing apparatus of the user.

2. The management system according to claim 1, wherein even in a case where the error information obtained by the obtaining unit indicates failure of the printing process on the basis of a print restriction designated by print restriction information assigned to the user, if a print setting of a print job corresponding to the error information is not a default setting of a printer driver used by the user, the setting unit does not perform a new default setting on the printer driver.

3. A software distribution server for distributing a printer driver, the software distribution server comprising:
    an obtaining unit configured to obtain error information based on failure of a printing process performed by a print job according to a printing instruction of a user; and
    a setting unit configured, when the error information obtained by the obtaining unit indicates failure of the printing process on the basis of a print restriction designated by print restriction information assigned to the user, to set a print setting as a default setting of the printer driver so as to reflect the print restriction designated by the print restriction information,
    wherein the failure of the printing process based on the print restriction designated by the print restriction information is failure caused by changing the print restriction designated by the print restriction information in accordance with a print result obtained in a printing apparatus of the user.

4. The software distribution server according to claim 3, further comprising a distributing unit configured to distribute the printer driver to a terminal by which the user issues a printing instruction when a default setting is performed by the setting unit.

5. The software distribution server according to claim 3, wherein even in a case where the error information obtained by the obtaining unit indicates failure of the printing process on the basis of a print restriction designated by print restriction information assigned to the user, if a print setting of a print job corresponding to the error information is not a default setting of a printer driver used by the user, the setting unit does not perform a new default setting on the printer driver.

6. A control method comprising:
    obtaining error information based on failure of a printing process performed by a print job according to a printing instruction of a user;
    setting a print setting as a default setting of a printer driver so as to reflect a print restriction designated by print restriction information, when the obtained error information indicates failure of the printing process on the basis of a print restriction designated by print restriction information assigned to the user; and
    distributing the printer driver to a terminal by which the user issues a printing instruction when a new default setting is performed in the setting step,
    wherein the failure of the printing process based on the print restriction designated by the print restriction information is failure caused by changing the print restriction designated by the print restriction information in accordance with a print result obtained in a printing apparatus of the user.

7. The control method according to claim 6, wherein in the setting step, even in a case where the error information obtained in the obtaining step indicates failure of the printing process on the basis of a print restriction designated by print restriction information assigned to the user, if a print setting of a print job corresponding to the error information is not a default setting of a printer driver used by the user, no new default setting is performed on the printer driver.

8. A non-transitory computer readable storage medium on which is stored a program for causing a computer to execute:
    obtaining error information based on failure of a printing process performed by a print job according to a printing instruction of a user;
    setting a print setting as a default setting of a printer driver so as to reflect a print restriction designated by print restriction information when the obtained error information indicates failure of the printing process on the basis of a print restriction designated by print restriction information assigned to the user; and distributing the printer driver to a terminal by which the user issues a printing instruction when a new default setting is performed in the setting step, wherein the failure of the printing process based on the print restriction designated by the print restriction information is failure caused by changing the print restriction designated by the print restriction information in accordance with a print result obtained in a printing apparatus of the user.

* * * * *